US006065917A

United States Patent [19]

Shambeau et al.

[11] Patent Number: 6,065,917

[45] Date of Patent: May 23, 2000

[54] TIE-DOWN ANCHOR

[75] Inventors: Thomas Allan Shambeau, Beaver Dam, Wis.; Loren Fredrick Hansen, Lincoln, Nebr.

[73] Assignee: Deere & Company, Moline, Ill.

[21] Appl. No.: 09/292,828

[22] Filed: Apr. 15, 1999

[51] Int. Cl.$^{7}$ ........ B60P 7/08

[52] U.S. Cl. ........ 410/107; 410/106; 410/111; 410/112

[58] Field of Search ........ 410/101, 107, 410/109, 111, 112, 116; 24/265 CD, 115 K, 132 R; 248/499

[56] References Cited

U.S. PATENT DOCUMENTS

| | | | |
|---|---|---|---|
| 2,532,743 | 12/1950 | Storch | 410/111 |
| 3,297,293 | 1/1967 | Andrews et al. | 248/499 |
| 3,412,693 | 11/1968 | Lewis | 410/111 |
| 4,907,921 | 3/1990 | Akright | 410/111 |
| 5,052,869 | 10/1991 | Hasnsen, II | 410/111 |
| 5,180,263 | 1/1993 | Flowers, Jr. | 410/106 |
| 5,248,176 | 9/1993 | Fredriksson . | |
| 5,509,710 | 4/1996 | Eavenson, Sr. et al. . | |
| 5,774,949 | 7/1998 | Petschke et al. . | |

OTHER PUBLICATIONS

John Deere, Military Gator Utility Vehicle brochure, 2 pages, published Mar. 1998 in U.S.A.

Kinedyne, Specialty Hardware Product Catalog, publication date and county unknown.

John Deere, Gator Utility Vehicles brochure, 8 pages, published Jan. 1998 in U.S.A.

Daihatsu America, Inc., Hijet Multipurpose Off–Road Utility Vehicle Daihatsu, publication date and country unknown.

*Primary Examiner*—Stephen T. Gordon
*Assistant Examiner*—S. Carpenter

[57] ABSTRACT

A tie-down anchor is provided for strapping cargo to a cargo bed. The tie-down anchor includes a receptacle member, which in turn includes a base and a mounting flange secured to the base. The mounting flange is mounted to the cargo bed in alignment with a mounting hole in the bed. A strap-receiving member is disposed in the receptacle member supported on the base for floating rotary and pivotal movement. The strap-receiving member includes a base leg having a length greater than the diameter of the mounting hole and an extension fixed to the base leg to create an opening for receiving the strap. The extension is narrower than the mounting hole so that the extension may pass through the mounting hole and extend above the bed.

10 Claims, 3 Drawing Sheets

10
12
14
16
18
20
22
24
26
28
30

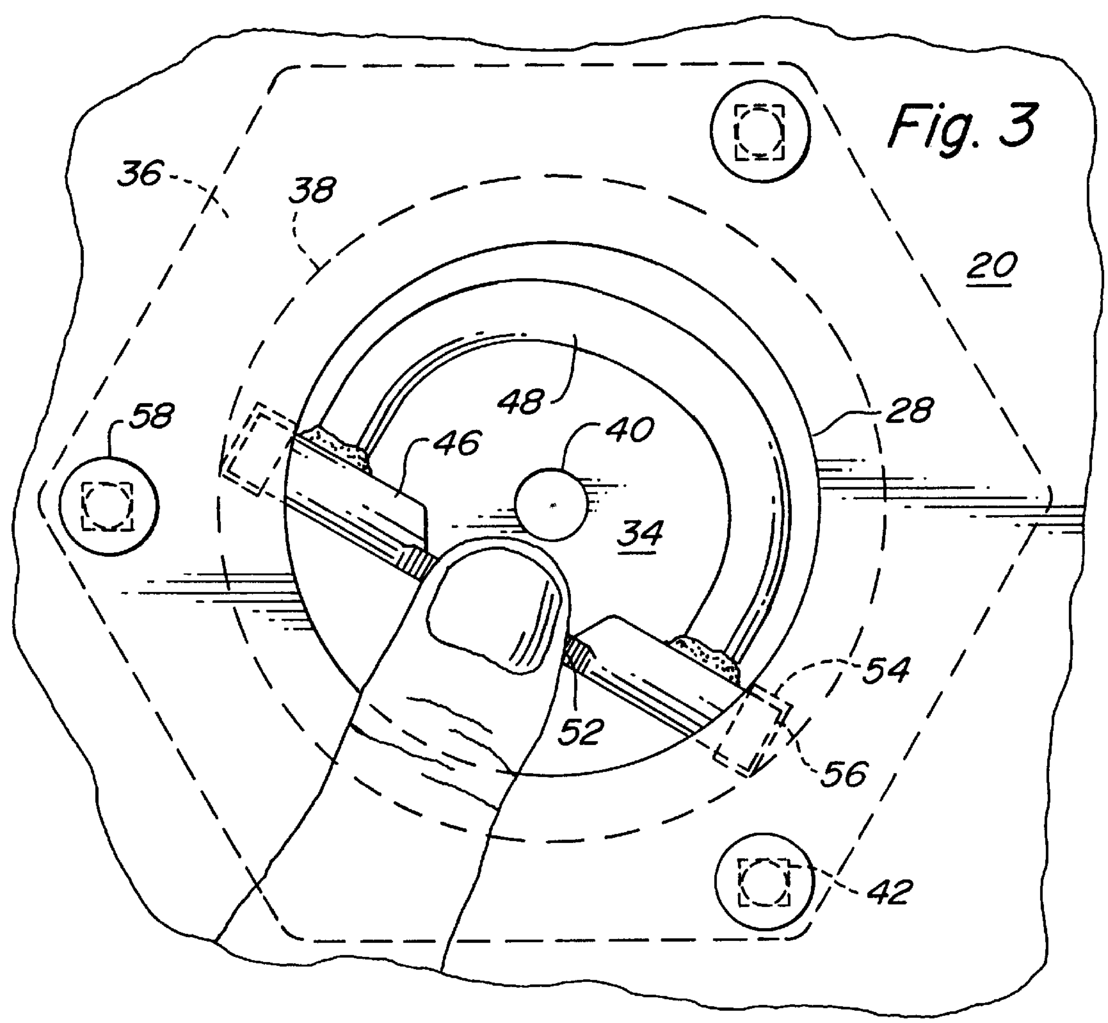
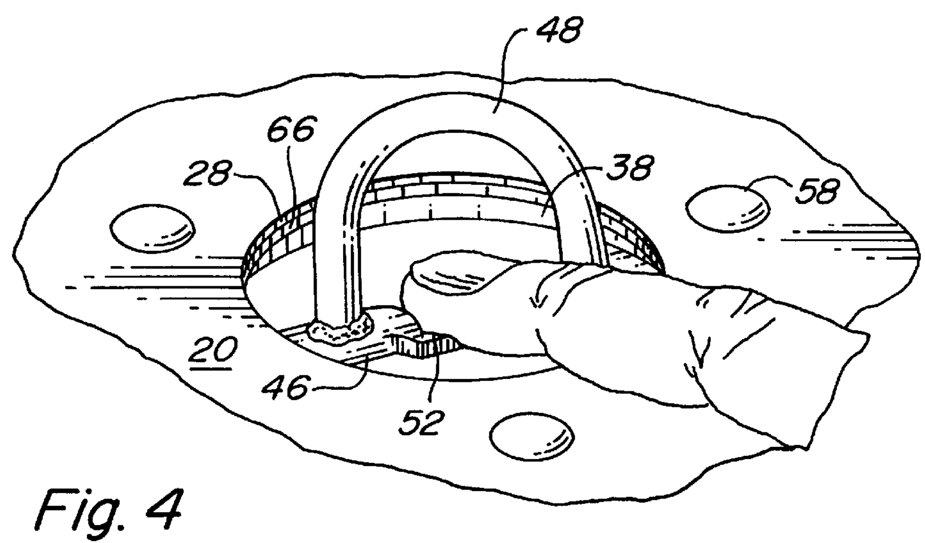
Fig. 4

TIE-DOWN ANCHOR

BACKGROUND OF THE INVENTION

1. Field of the Invention

The present invention relates to tie-down apparatus usable with cargo beds and more particularly relates to a tie-down anchor including a rotatable and pivotable ring.

2. Description of Related Art

Various straps such as resilient or adjustable-length bands and roping elements are frequently used to lash cargo in place on a trailer or cargo bed. It is often advantageous to attach the strap to a tie-down anchor secured on or adjacent the bed. Anchors including rings are commonly used in such applications, and frequently include a D-shaped, triangular, or rectangular ring that is pivotally journaled in a base. The base, in turn, is attached to the trailer or a truck bed with bolts or rivets.

Tie-down anchors that are freely rotatable and/or pivotable relative to the base can cause annoying rattling and vibrating sounds when the vehicle is moving. Even so, tie-down anchors that are freely pivotable relative to the base are advantageous in that they can usually fold compactly against the base when not in use. Bases are often formed as part of pan-style receptacles utilized to recess most or all of the anchor below the surface of the bed (or into a sidewall) to prevent a protruding part from snagging and damaging freight which comes into contact with the anchor. It may also be desirable to recess an anchor into the bed to maintain a substantially flat surface when the anchor is not in use.

SUMMARY OF THE INVENTION

It is therefore desirable to provide a tie-down anchor that overcomes the disadvantages of the prior art structures.

Toward this goal, there is provided a tie-down anchor having a strap-receiving member supported for floating pivotal and rotary movement in a receptacle. The preferred embodiment of the receptacle takes the form of a plastic dish that may be manufactured inexpensively. The simple two-part construction provides a tie-down anchor which will perform its operation reliably, even in dirty or contaminated environments.

A preferred embodiment of the tie-down anchor assembly includes a receptacle member having a base and a mounting flange secured to the base. The mounting flange is secured to the cargo bed in alignment with a mounting hole provided in the bed. A strap-receiving member such as a ring is disposed in the receptacle member and supported on the base for rotary and pivotal movement. The strap-receiving member includes a base leg having a length greater than the diameter of the mounting hole and an extension fixed to the base leg to create an opening for receiving the strap. The extension is narrower than the mounting hole so that the extension may pass through the mounting hole and extend above the bed.

The tie-down anchor assembly is durable, reliable, inexpensive to fabricate and simple to assemble. The strap-receiving member need not be secured to the base but is trapped between the base and a supporting surface such as the cargo bed. Also, the receptacle may be made of synthetic materials so that noise is reduced as the cargo bed or trailer to which the anchor is mounted traverses uneven ground.

Other objects and advantages of the present invention will be apparent upon reading the following detailed description and accompanying drawings.

BRIEF DESCRIPTION OF THE DRAWINGS

FIG. 3 is a top plan view of the tie-down anchor assembly; and

FIG. 4 is a perspective view of the tie-down anchor assembly wherein the ring has been pivoted to an upright position.

DESCRIPTION OF THE EXEMPLARY EMBODIMENT

Figure 1:
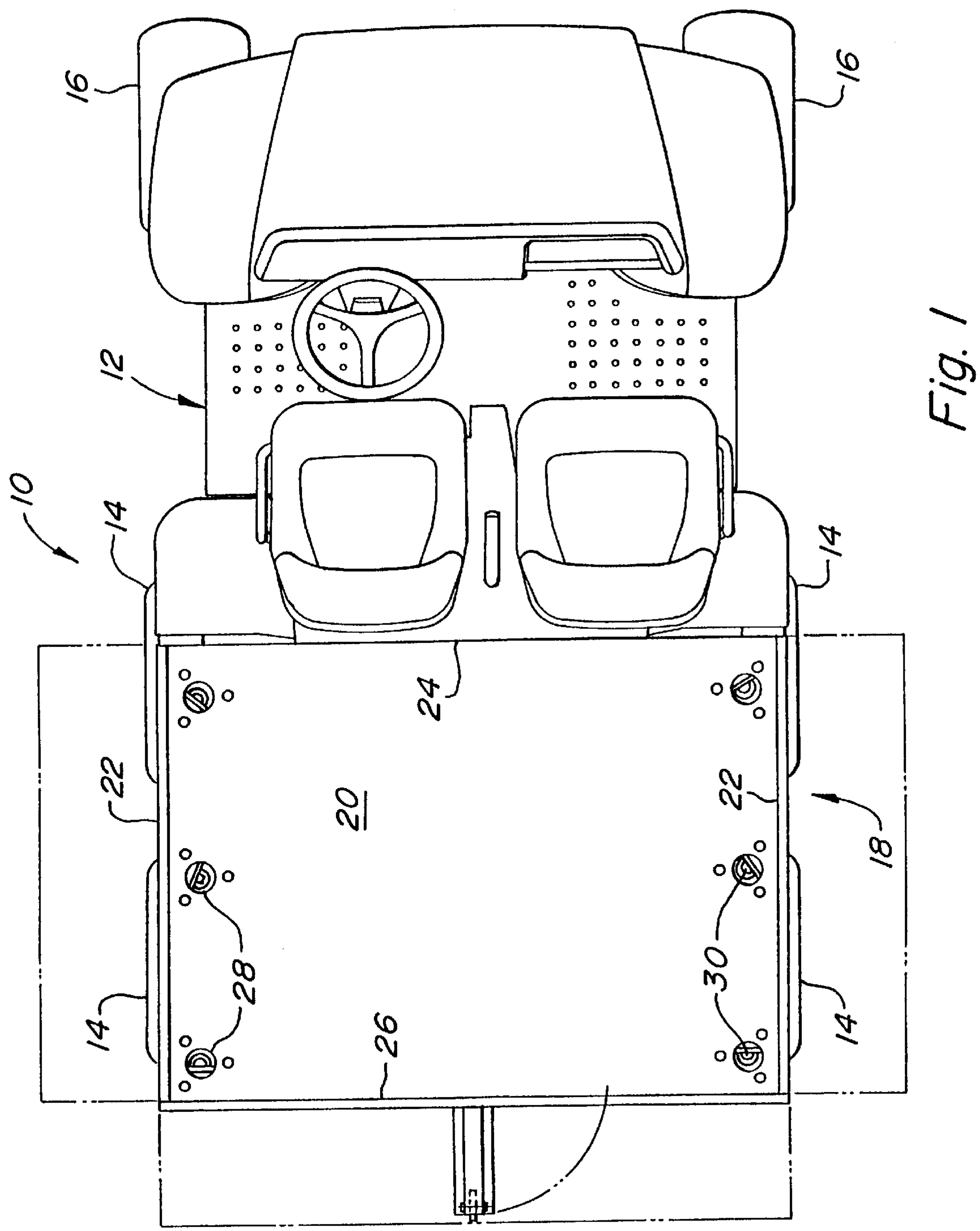
FIG. 1 is a top plan view showing a plurality of tie-down anchor assemblies according to the present invention operatively attached to the cargo bed of a utility vehicle.

FIG. 1 shows a utility hauling vehicle 10 including a frame 12 supported by four drive wheels 14 and a pair of steerable front wheels 16. Supported on the frame 12 in a location above the drive wheels 14 is a cargo box 18. The box 18 includes a horizontal floor or bed 20 and vertical right and left sidewalls 22, a front wall 24 and a tailgate 26. The tailgate 26 forms a rear wall of the box 18 and is mounted for selectively closing the opening defined by the rear edges of the floor 20 and the sidewalls 22. The sidewalls 22 are also mounted for pivoting about horizontal axes. In this manner, the sidewalls 22 and the tailgate 26 may be pivoted from closed, upright positions to open, recumbent positions wherein they effectively become extensions of the floor 20 and the cargo box 18 may be thereby converted to a flat bed (shown in phantom). The bed 20 is provided with spaced-apart apertures 28 for accommodating a plurality of tie-down anchor assemblies 30.

Figure 2:
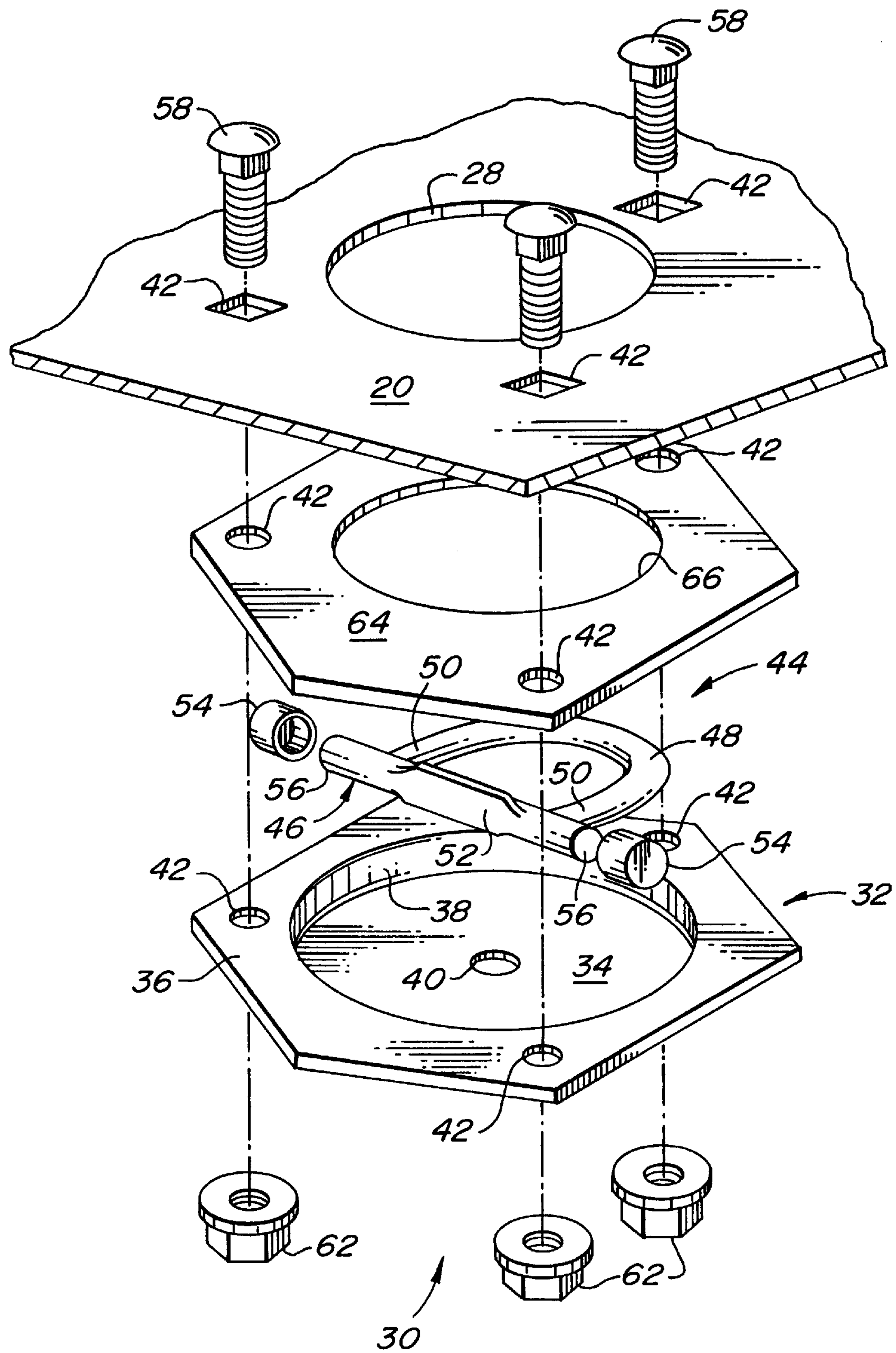
FIG. 2 is an exploded perspective view of one of the tie-down anchor assemblies of FIG. 1.

A tie-down anchor assembly 30 constructed according to the present invention is shown in exploded fashion in FIG. 2. The tie-down anchor assembly 30 is of the type for securing cargo by straps to a support structure, such as the bed 20. However, those skilled in the art will readily appreciate many additional applications of the present invention.

The tie down anchor assembly 30 of the present invention includes a receptacle member 32 with a flat, generally circular base 34, a mounting flange 36 and an intermediate sidewall portion 38 joining the base 34 and the mounting flange 36. A weep hole 40 is provided in the base 34 to expel moisture and debris, and a plurality of holes 42 for receiving fastening devices are spaced about the periphery of the mounting flange 36. Preferably, the receptacle member 34 is molded as a single piece from a composite material such as a high molecular weight polyethylene. Fabricating the receptacle member 32 of such a composite material serves to reduce noise and also assists in making the receptacle member 32 weather resistant.

A ring, generally indicated at 44, is formed in a separate operation into an endless shape having a generally straight cylindrical base leg 46 and an extension 48. The extension 48 may take the form of a substantially arcuate shape, as shown in FIG. 4, wherein the resulting periphery of the ring 44 is generally D-shaped (although the base leg 46 is longer than a straight leg of a D). However, those skilled in the art will readily appreciate other satisfactory peripheral geometric shapes of the ring 44 for providing an opening through which a strap may be inserted, such as the triangular or rectangular shapes used in certain prior art structures. The diameter of each of the apertures 28 is less than the length of the base leg 46 so that, when the receptacle member 32 is secured to the bed 20, the base leg 46 is trapped between the bed 20 and the base 34. The ring 44 is preferably fabricated from round stock suitable for such applications, with ends 50 of the extension 48 butted against the base leg 46 and joined thereto as by welding, the ends 50 spaced apart generally symmetrically about the midpoint of the length of the base leg 46. Preferably, the base leg 46 is stamped during fabrication to provide a flattened portion 52 at its midpoint.

Because the support structure used in FIGS. 1–4 to restrain the ring 44 and to hold cargo is the material of the bed 20, it may be desirable or necessary to reduce the likelihood of excessive stress by providing a strength plate 64 (shown in FIGS. 2 and 4) sandwiched between the mounting flange 36 and the bed 20. The strength plate 64 has a central hole 66 and peripheral bolt receiving holes 42. The central hole 66 is preferably substantially the same diameter as the aperture 28 in the bed 20 so that, when loaded, the base leg 46 of the ring 44 will bear on the strength plate 64 so that force will be transferred to the bed 20 over a larger area.

Under some circumstances, it may be desirable to place resilient caps 54 over ends 56 of the base leg 46 to further reduce noise as the vehicle 10 travels over uneven terrain. By making the resilient caps 54 lightly larger in diameter than the distance between the base 34 and the bottom of the bed 20 (or strength plate 64, if used) when the anchor assembly 30 is assembled, the resilient caps 54 may be designed to restrain the ring 44 in any pivotal, rotary and lateral position with respect to the base 34. Under other circumstances (e.g., where freedom of movement of the ring 44 is a priority), the caps 54 may be omitted.

The tie-down anchor assembly 30 may be secured to the bed 20 by a fastener or fasteners, such as rivets or threaded carriage bolts 58. The carriage bolts 58 are inserted from above the bed 20 and passed through each of the receiving holes 42 in the bed 20, the strength plate 64 (if used) and the mounting flange 36, which are aligned with one another as shown in FIG. 2. Threads of the carriage bolts 58 may then be engaged by lock nuts 62 to fix the anchor 30 against the bed 20. In this way, only rounded heads of the carriage bolts 58 project above the bed 20. Alternatively, suitable attachment to the underside of the bed 20 may be made by conventional methods so that no structure associated with the anchor assembly 30 will project above the bed 20. For example, a self-tapping bolt may be provided for engagement with suitable corresponding structure provided on the underside of the bed 20 or other support structure. If carriage bolts 58 are used, the receiving holes 42 in the bed 20 will preferably be of square configuration to accommodate square shanks of the carriage bolts 58 to simplify tightening of the nuts 62 on the bolts 58.

Referring now to FIG. 3, a tie-own anchor assembly 30 is shown wherein the ring 44 is in a recumbent storage position beneath the bed 20. The ring 44 is pivotable by the thumb or finger of an operator engaging the flattened portion 52 of the base leg 46 in the manner shown. Where, as shown in FIGS. 24, the base 34 of the receptacle member 32 has a diameter greater than the length of the base leg 46, the ring 44 may move laterally when engaged by the operator. If desired, the diameter of the base 34 may be made substantially the same as the length of the base leg 46 so that rotary and pivotal movement of the ring 44 are possible while lateral movement with respect to the base 34 is prevented. However, increased precision in fabrication of the ring 44 and the receptacle member 32 would be required, representing increased cost. Also, capacity for relative lateral movement of the ring 44 may be desirable under some circumstances. In the embodiment shown in FIGS. 2–4, the ring 44 may slide laterally until the ends 56 of the base leg 46 are aligned with a chord of equal length taken across the base 34 (so that the ends 56 of the base leg 46 are prevented from further lateral movement by the intermediate sidewall portion 38), after which the ring 44 will pivot so that the extension 48 will be raised. The periphery of the extension 48 is smaller than the aperture 28 so that the extension 48 rises above the bed 20.

The operator may also rotate the ring 44 about an axis extending through the midpoint of the base leg 46 generally perpendicular to flattened portion 52. Rotary positioning of the ring 44 in combination with pivotal movement about the base leg 46 allows the extension 48 to achieve a desired attitude (to direct the extension 48 toward the next point where a strap is secured, for example).

FIG. 4 shows a perspective view of the tie-down anchor assembly 30 wherein the ring 44 has been pivoted through central hole 66 of the strength plate 64 and the apertures 28 in the bed 20 to a raised, upright position, as for receiving a strap. When a strap is received by the ring 44, force applied to the ring 44 by the strap (by engagement between the strap and the extension 48) will be transferred to the bed 20 by the base leg 46, either through direct contact or through the strength plate 64, if used.

In accordance with the foregoing description, the present invention provides a tie-down anchor assembly 30 which is simple, inexpensive, durable and reliable. The receptacle member 32 and the ring 44 represent a simple two-piece construction. Since the ring 44 is trapped between the cargo bed 20 and the base 34 of the receptacle member 32, no attachment of the ring 44 to the base 34 is required. The anchor assembly 30 may therefore be inexpensively fabricated and assembled.

In a preferred embodiment of the tie-down anchor assembly 30, the receptacle member 32 is secured beneath the cargo bed 20 so that the base 34 of the receptacle member 32 is recessed below the bed 20. When not in use, the ring 44 may rest against the base 34 so that no portion of the ring 44 extends above the cargo bed 20 so that the cargo bed 20 may provide a substantially flat surface for loading and carrying cargo. An operator may easily pivot the ring 44 to an upright position by engaging a flattened portion 52 of the base leg 46 of the ring 44 with a single finger.

Preferably, the receptacle member 32 is molded as a single piece from a composite material such as polyethylene, making a weather resistant piece which serves also to reduce vibration and noise associated with prior art structures. A weep hole 40 provided in the base 34 expels moisture and debris.

Although the invention is described with reference to an illustrative embodiment, it will be understood by those skilled in the art that the invention may be advantageous in the form described as modified for use in other applications. The present invention should not be limited by the above-described embodiments, but should be limited solely by the claims that follow.

We claim:

1. A tie-down anchor assembly for securing cargo with a tie-down strap to a cargo bed having a mounting hole, said tie down anchor assembly comprising:

a receptacle member including a base and a mounting flange secured to the base and spaced apart therefrom, said mounting flange securable to the cargo bed in alignment with the mounting hole; and a strap-receiving member disposed in the receptacle member supported on the base for relative rotary and pivotal movement, said strap-receiving member including a base leg having a length greater than a diameter of the mounting hole and a swingable extension connected to the base leg, said extension having an opening for receiving the strap and having a width smaller than the width of the mounting hole so that the extension may pass through the mounting hole and extend above the bed.

2. The tie-down anchor of claim 1 wherein the base of the strap-receiving member includes a flattened portion engageable by a finger of an operator for effecting pivotal movement of the strap-receiving member relative to the base.

3. The tie-down anchor of claim 1 wherein the receptacle member is made of a composite material.

4. The tie-down anchor of claim 1 additionally comprising a strengthening spacer disposable between the mounting flange and the cargo bed, said strengthening spacer having a hole, the hole having a diameter smaller than the length of the base leg.

5. The tie-down anchor of claim 1 wherein said base has a weep hole.

6. A tie-down anchor assembly for securing cargo with a tie-down strap to a cargo bed having a mounting hole, said tie down anchor assembly comprising:

a receptacle member including a base and a mounting flange secured to the base and spaced apart therefrom, said mounting flange securable to the cargo bed in alignment with the mounting hole; and a strap-receiving member disposed in the receptacle member supported on the base for relative rotary and pivotal movement, said strap-receiving member including a base leg having a length greater than a diameter of the mounting hole and an arcuate extension having first and second ends connected to the base leg, said extension having an opening for receiving the strap and having a width smaller than the diameter of the mounting hole so that the extension may pass through the mounting hole and extend above the bed;

said base leg having a flattened portion disposed between the first and second ends of the arcuate extension.

7. The tie-down anchor of claim 6 wherein the receptacle member is made of a composite material.

8. The tie-down anchor of claim 6 additionally comprising a strengthening spacer disposable between the mounting flange and the cargo bed, said strengthening spacer having a hole, the hole having a diameter smaller than the length of the base leg.

9. The tie-down anchor of claim 6 wherein said base has a weep hole.

10. A tie-down anchor for securing cargo with a tie-down strap to a cargo bed having a mounting hole, said tie down anchor comprising:

a composite receptacle member including a base, a mounting flange, and an intermediate sidewall connecting the mounting flange to the base, said mounting flange mountable to the cargo bed in alignment with the mounting hole; and a strap-receiving member disposed in the receptacle member supported on the base for relative rotary, pivotal and lateral floating movement, said strap-receiving member including a base leg having a length greater than a diameter of the mounting hole and an arcuate extension having first and second ends connected to the base leg, said extension forming with the base leg a hole for receiving the strap, said extension having a width smaller than the width of the mounting hole so that the extension may pass through the mounting hole and extend above the bed;

said base leg having a flattened portion disposed between the first and second ends of the arcuate extension.

* * * * *